(12) United States Patent
Boon et al.

(10) Patent No.: US 6,451,949 B2
(45) Date of Patent: Sep. 17, 2002

(54) METHOD FOR PRODUCTION OF POLY (TRIMETHYLENE CARBONATE)

(75) Inventors: Wyndham Henry Boon, North Canton, OH (US); Roy Frank Smith, Pearland, TX (US); David Eric Gwyn, Houston, TX (US); Thomas Clayton Forschner, Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/780,930

(22) Filed: Feb. 9, 2001

Related U.S. Application Data

(60) Provisional application No. 60/185,650, filed on Feb. 29, 2000.

(51) Int. Cl.$^7$ .............................................. C08F 18/24
(52) U.S. Cl. ..................... 526/314; 526/173; 526/181; 526/269; 526/270
(58) Field of Search ................................ ; C08F 18/24

(56) References Cited

U.S. PATENT DOCUMENTS

| | | | |
|---|---|---|---|
| 3,313,782 A | 4/1967 | Springmann et al. | ....... 260/77.5 |
| 4,105,641 A | 8/1978 | Buysch et al. | ............... 526/712 |
| 5,549,987 A | 8/1996 | Venugopal et al. | ......... 429/188 |

FOREIGN PATENT DOCUMENTS

| | | | |
|---|---|---|---|
| DE | 4318204 A1 | 8/1994 | |
| EP | 0600417 A1 | 3/2001 | |
| JP | 64001724 | 1/1989 | ........... C08G/63/62 |

OTHER PUBLICATIONS

Matsumura S. et al., "Enzyme–Catalyzed Ring–Opening Polymerization of 1,3–Dioxan–2–One to Poly(Trimethylene Carbonate)" Macromolecules, American Chemical Society, Easton, US, vol. 30, No. 10, (May 19, 1997), pp. 3122–3124, XP000689084 ISSN: 0024–9297, p. 3122, left–hand column, paragraph 3, Mar. 12, 2001.

International Search Report of Dec. 3, 2001.

"Homopolymerization of 1,3–Dioxan–2–one to High Molecular Weight Poly(Trimethylene Carbonate)," by A. Albertsson and M. Sjöling, J. Macromol. Sci, Pure Appl. Chem., A29(1), pp. 43–54 (1992).

"Synthesis of Copolymers of 1,3–Dioxan–2–one and Oxepan–2–one Using Coordination Catalysts," by A. Albertsson and M. Eklund, J. Polym. Sci., Part A: Polym. Chem., 32(2), pp. 265–279 (1994).

"Lipase–Catalyzed Ring–Opening Polymerization of Trimethylene Carbonate," by K. S. Bisht et al., Macromolecules, 30(25), 7735–7742 (1997).

"Polymers of Carbonic Acid: 13. Polymerization of Cyclotrimethylenecarbonate With tin Tetrahalides," by H. R. Kricheldorf and B. Weegan–Schulz, Polymer, 36(26), pp. 4997–5003 (1995).

"Polymers of Carbonic Acid, Spontaneous and Hematin–Initiated Polymerizations of Trimethylene Carbonate and Neopentylene Carbonate," by H. R. Kricheldorf et al., Macromol. Chem., Phys., 197(3), pp. 1043–1054 (1996).

"Ring–Opening Polymerization of Cyclic Carbonates by Alcohol–Acid Catalyst," by J. Matsuo et al., J. Polym. Sci., Part A: Polym. Chem., 36(14) pp. 2463–2471 (1998).

"Ring–Opening Polymerization of $\epsilon$–Caprolactone and Trimethylene Carbonate Catalyzed by Lipase Novozym 435," by F. Deng et al. Polym. Prepr. (Am. Chem. Soc., Div. Polym. Chem.), 39(2), pp. 144–145 (1998).

"Polymers of Carbonic Acid. XIV. High Molecular Weight Poly(Trimethylene Carbonate) by Ring–Opening Polymerization With Butyltin Chlorides as Initiators," by H. R. Kricheldorf et al., J. Polym. Sci., Part A: Polym. Chem., 33(13), pp. 2193–2201 (1995).

"Cationic Ring–Opening Polymerization Behavior of an Aliphatic Seven–Membered Cyclic Carbonate, 1,3–Dioxepan–2–one," by J. Matsuo et al., Macromol. Chem. Phys., 199(1), pp. 97–102 (1998).

"Polylactones. 16. Cationic Polymerization of Trimethylene Carbonate and Other Cyclic Carbonates," by H. R. Kricheldorf et al., Macromol. Sci–Chem., A26(4), pp. 631–644 (1989).

"Alkyl Halide–Initiated Cationic Polymerization of Cyclic Carbonate," by Ariga et al., J. Polym. Sci., Part A: Polym. Chem., 31(2), pp. 581–584 (1993).

"Polymers of Carbonic Acid, Polymerization of Trimethylene Carbonate (1,3–Dioxan–2–One) With Complexation Catalysts," by H. R. Kricheldorf et al., Makromol. Chem. 192, pp. 2391–2399 (1991).

"Cationic Ring–Opening Polymerization of Cyclic Carbonates With Alkyl Halides to Yield Polycarbonate Without the Ether Unit by Suppression of Elimination of Carbon Dioxide," by T. Ariga et al., Macromolecules 1997, 30, pp. 737–744.

"A Comparison of Polymerization Characteristics and Mechanisms of $\epsilon$–Caprolactone and Trimethylene Carbonate With Rare Earth Halides," by Y. Shen et al., Department of Polymer Science and Engineering, Zhejiang University, Hangzhou 310027, China, pp. 1339–1352.

Primary Examiner—Helen L. Pezzuto
(74) Attorney, Agent, or Firm—Donald F. Haas

(57) ABSTRACT

Disclosed is a process for the production of poly (trimethylene carbonate) which comprises reacting trimethylene carbonate, a catalyst, and an alcohol, preferably a polyhydric alcohol, under nitrogen at atmospheric pressure and a moderate temperature, in a stoichiometric ratio to give the desired molecular weight of poly(trimethylene carbonate) in the presence of a catalyst selected from the group consisting of a salt, preferably an acetate, of an element of Group IA or IIA of the Periodic Table. In an alternative embodiment, high molecular weight poly (trimethylene carbonate) is produced without the use of an initiator, using the same catalyst and longer reaction times.

37 Claims, No Drawings

METHOD FOR PRODUCTION OF POLY (TRIMETHYLENE CARBONATE)

This application claims the benefit of U.S. Provisional Application No. 60/185,650, filed Feb. 29, 2000, the entire disclosure of which is hereby incorporated by referenced.

FIELD OF INVENTION

This invention relates to a method of producing poly(trimethylene carbonate)(PTMC). More particularly, this invention relates to an improved method of producing poly(trimethylene carbonate) in which no decarboxylation is observed. In addition, the improved method results in an extremely desirable quality of poly(trimethylene carbonate), characterized in that the product is particularly clear and virtually all end groups are hydroxypropyl groups, with no measurable allyl end groups.

BACKGROUND OF THE INVENTION

In methods currently known in the art for the production of poly(trimethylene carbonate), problems with decarboxylation during the reaction are common and the products typically have an undesirably large percentage of allyl end groups. Allyl end groups are undesirable, because they reduce the hydroxyl functionality, result in dead ends, and are less effective in chemistry which requires hydroxy terminated species, such as, for example, in urethane or melamine chemistry. In addition, the transparency of poly(trimethylene carbonate) currently available in the art is typically not as clear as would be desirable, thus presenting problems in obtaining the clarity sought after in clear urethane or melamine coatings formulations.

It is known in the art that cyclic carbonates can be converted in the presence of polyhydric alcohols at higher temperatures and under increased pressures into liquid to viscous polycarbonates of relatively low molecular weight. It is also known that cyclic carbonates can be converted without the presence of alcohols.

Various groups of catalysts are known in the art for ring-opening polymerization, however previously used catalysts generally have one or more undesirable effects, such as, for example, longer reaction times, poor conversion, color formation, decarboxylation, and the formation of allyl end groups. Decarboxylation is undesirable because it yields ether links which reduce UV and thermal stability of the material and allyl end groups reduce the hydroxyl functionality.

Kricheldorf, et al, used methyl triflate or triethyloxonium fluorborate to polymerize 1,3-dioxan-2-one, as discussed in *J. Macromol. Sci., Chem.*, A26(4), 631–44 (1989), however this article describes many side chemistries. In *Makromol. Chem.*, 192(10), 2391–9 (1991), Kricheldorf, et al, describe numerous bulk polymerizations of trimethylene carbonate, at various temperatures, using catalysts containing butyl groups, tin, and bromide, inter alia; ether groups were not found, and all polycarbonates contain a $CH_2$ $CH_2$ $CH_2OH$ end-group. It does not appear these products were examined for clarity. In the present invention it was found that using catalysts of the type described by Kricheldorf, et al resulted in products with less clarity than those described herein. In *Polymer*, 36(26), 4997–503 (1995), Kricheldorf, et al, used tin halides for polymerization of cyclotrimethylene carbonate. Additional work, described in *J. Polym. Sci., Part A: Polym. Chem.*, 33(13), 2193–201(1995), described the use of $BuSnCl_3$—, $Bu_2SnCl_2$—, and $Bu_3SnCl$ initiators. In both studies using tin-containing compounds the chemistry results in dead ends and further chemistry would be required to convert the halide end groups to hydroxy groups. An article by Kricheldorf, et al, in *Macromol. Chem. Phys.*, 197(3), 1043–54 (1996), discloses the spontaneous and hematin-initiated polymerizations of trimethylene carbonate and neopentylene carbonate. This method would also result in dead ends.

In an article titled, "Homopolymerization of 1,3-dioxan-2-one to high-molecular-weight poly(trimethylene carbonate)", in *J. Macromol. Sci.—Chem.*, 29(1), 43–54 (1991), Albertsson, et al, discuss the use of sodium ethoxide or stannous 2-ethylhexanoate as a transesterification catalyst. It was found that the polymer contained 2.6% ether linkages formed by decarboxylation during polymerization at high temperature. At page 51, it is stated "Immediately after the polymerization, all the polymers were transparent, but on cooling the polymers with low molecular weight became opaque due to crystallization of unreacted monomer". In *J. Macromol. Sci.—Chem.*, 29(1), 43–54 (1991), Albertsson, et al, discuss the homopolymerization of 1,3-dioxan-2-one to high molecular weight poly(trimethylene carbonate) using either EtONa or stannous 2-ethylhexanoate as the transesterification catalyst. This chemistry generated significant amounts of decarboxylation. In an article by Albertsson, et al, *J. Macromol. Sci., Pure Appl. Chem.*, A29(1), 43–54 (1992), there is described the homopolymerization of 1,3-dioxan-2-one to high molecular weight poly(trimethylene carbonate). This chemistry also generated significant amounts of decarboxylation. In *J. Polym. Sci., Part A: Polym. Chem.*, 32(2), 265–79 (1994), Albertsson, et al, describe a new type of copolymer synthesized from 1,3-dioxan-2-one and oxepan-2-one using either tin octoate, zinc acetate, dibutyltin oxide, or tributyltinchloride as the catalyst.

In German Patent Application EP 96-117263 there is disclosed a method of rendering polyesters such as polylactides, lactide/glycolide copolymers, and poly(trimethylene carbonates) hydrophobic by reaction of terminal OH and/or $CO_2H$ groups with long-chain fatty acids and/or fatty alcohols or their derivatives. This reference primarily discloses a particular product and would result in dead ends in urethane and coatings applications.

An alkyl halide-initiated cationic polymerization of cyclic carbonate is described in an article by Ariga, et al, *J. Polym. Sci., Part A: Polym. Chem.*, 31(2), 581–4 (1993). It is believed this chemistry would produce one dead end for every initiator group.

A rare earth halide was used in the ring-opening polymerization of trimethylene carbonate, as well as ε-caprolactone, in an article by Shen, et al, *J. Polym. Sci., Part A: Polym. Chem.*, 35(8), 1339–1352 (1997). Rare earths are typically pro-oxidants and, therefore, would be expected to negatively impact aging properties of poly(trimethylene carbonate).

In an article by Ariga, et al, in *Macromolecules*, 30(4), 737–744 (1997), there is disclosed the cationic ring-opening polymerization of cyclic carbonates with an alkyl halide as initiator. The methods discussed in this reference would produce dead ends, thus making the products unsuitable for urethanes and coatings.

The use of an alcohol-acid catalyst for the ring-opening polymerization of cyclic carbonates is described in an article by Matsuo, et al, *J. Polym. Sci., Part A: Polym. Chem.*, 36(14), 2463–2471(1998). The product of this method would result in dead ends and would require hydrolysis to produce active end groups.

In *Polym. Prepr.* (Am. Chem. Soc., Div. Polym. Chem.), 39(2), 144–145 (1998), an article by Deng, et al, describes the ring-opening polymerization of ε-caprolactone and trimethylene carbonate catalyzed by lipase Novozym 435. In this case, the removal of the lipase would be problematic.

In an article by Bisht, et al, in *Macromolecules*, 30(25), 7735–7742 (1997), the use of lipase-catalyzed ring-opening polymerization was extended to cyclic carbonate monomers.

An article by Matsuo, et al, in *Macromol. Chem. Phys.*, 199(1), 97–102 (1998), describes the ring-opening polymerization of a 7-membered cyclic carbonate in nitrobenzene; and of a 6-membered cyclic carbonate in dichloromethane, the latter generally accompanied by partial elimination of $CO_2$. This paper supports the observation that decarboxylation occurs when polymerizing trimethylene carbonate.

There is still a technical demand for the development of a process by which poly(trimethylene carbonate) of a quality that would exhibit optimum properties for use in urethane chemistry could be obtained, and which would also be economical and uncomplicated in operation. It would be particularly desirable in the art if poly(trimethylene carbonate) could be made in one simple step, while avoiding the typical decarboxylation and formation of allyl end groups. It would constitute a great advance in the art and would be extremely advantageous commercially if poly(trimethylene carbonate) could be made with essentially 100% hydroxypropyl end groups and as clear and colorless as water.

SUMMARY OF THE INVENTION

According to the present invention this problem is solved by reacting trimethylene carbonate with an alcohol comprising preferably one or more mono- or polyhydric alcohols, and most preferably propanediol or trimethylolpropane, preferably without a solvent, in stoichiometric amounts to produce the desired poly(trimethylene carbonate) molecular weight, optionally, and preferably, using as a catalyst a salt of an element of Group IA or IIA of the Periodic Table, preferably sodium acetate, said reaction taking place under inert atmosphere, such as nitrogen, at or near atmospheric pressure at a temperature of from about 110 to 140° C. for up to about 4 hours, preferably about 0.25–3 hours. An alternative embodiment for producing primarily higher molecular weight products can be accomplished with no initiator.

The product is the color of water, with virtually all end groups being hydroxypropyl groups, with no measurable allyl groups. In addition, no decarboxylation is observed during the polymerization and no other groups are detected. The invention is especially useful for producing low molecular weight poly(trimethylene carbonate).

DETAILED DESCRIPTION OF THE INVENTION

In view of the many variables that would influence the polymerization, the fact that hydroxy end groups are easy to dehydrate, and that the carbonate unit is easily decarboxylated, it was by no means foreseeable that the process according to the present invention would be able to fulfill such varied improvements as producing a water white product with virtually all end groups being hydroxypropyl groups, with no measurable allyl groups, using no solvent, moderate temperatures, and atmospheric pressure. In addition, the reaction proceeds rapidly, typically 30 to 120 minutes. In the alternative embodiment for producing higher molecular weight products without an initiator, the reaction typically proceeds in from about 5 to 30 hours. While the product of Example 3 was produced in about 20 hours, the reaction could take place in a much shorter period.

In the process of the present invention to produce poly(trimethylene carbonate) characterized by these excellent properties, trimethylene carbonate (TMC) is reacted with a polyhydric alcohol in the presence of a catalyst. The polyhydric alcohol can be a diol or triol or higher polyhydric alcohol. Among the diols illustrative of those that are useful in forming PTMC in the present invention are ethylene glycol, propanediol, butanediol, neopentyl glycol, pentanediol, hexanediol, and mixtures thereof. Triols considered useful include, for example, glycerin, trimethylolethane, trimethylolpropane, and higher functionality alcohols such as, for example, pentaerythritol. Propanediol and trimethylolpropane were used in the examples.

The process can take place without a catalyst, however the catalyst provides the advantage of faster reaction times and greater transparency of the product. Suitable catalysts for the present invention are selected from salts of Group IA or Group IIA of the Periodic Table. Good results were obtained where the compound was an acetate. Examples include, but are not limited to, acetates of potassium, sodium, lithium, and calcium. By comparison, Group IVA compounds were slower and resulted in a product with lower transparency. Particularly good results were obtained using sodium acetate.

The catalysts just described are effective in small amounts. The total weight of the alkali or alkaline-earth metal charged was calculated to result in the desired total metal weight based on reactants. While one could employ an amount of metal in the catalyst ranging from less than 1 ppm to greater than 10,000, one would typically expect to use an amount in the range of 5 to 1000 ppm, preferably about 10 to 100 ppm, and most preferably about 10–40 ppm. In the production of higher molecular weight polymers good results were obtained using somewhat higher ppms, say from about 40 to 150ppm. In Example 3 the amount of sodium metal was 100 ppm. The catalyst is preferably in anhydrous form.

The poly(trimethylene carbonate) in the present invention was produced without a solvent. Though a solvent is typically not used, the reaction could be performed in the presence of a solvent and, in that case, suitable solvents would include solvents not containing hydroxyl groups.

A suitable reaction temperature is in the range of 50–160° C. A preferred range is from about 100–150° C., and more preferably from about 110–130° C.

The process is generally performed in a kettle or reactor with a means of stirring under inert atmosphere. The trimethylene carbonate monomer, polyhydric alcohol, and an anhydrous alkali or alkaline earth metal acetate catalyst were typically placed in a polymerization kettle containing a stirring mechanism. The quantity of polyhydric alcohol, typically propanediol or trimethylolpropane, charged was the stoichiometric amount calculated to give the desired molecular weight of poly(trimethylene carbonate). The quantity of the catalyst charged was calculated to result in the desired total metal weight, typically 40 ppm of metal based on reactants. Under nitrogen at atmospheric pressure, the kettle was heated to typically 110–150° C. while the contents were stirred. The reaction proceeded fairly rapidly, typically taking from about 30 to 120 minutes. The resulting polyols were produced faster and exhibited greater clarity than those produced using catalysts such as tin(II), aluminum (III), or titanium (IV), or without a catalyst, in all of which cases the reaction proceeds more slowly.

In the reaction of trimethylene carbonate and a polyhydric alcohol in the presence of a Group IA or IIA catalyst pressure is not critical, and actually almost any pressure could be used, but the examples demonstrate that good results were obtained using ambient pressure.

The product of this process will have properties that are determined by several factors, the most important factors being the amount and identity of any initiating alcohol(s), catalysts and catalyst amounts, and the process conditions. A manufacturer may vary the determining factors to predictably produce the molecular weight, polydispersity, and other characteristics needed for the intended application.

Monofunctional oligomers and polymers can be produced by this process. The process is more efficient for producing materials of the same molecular weight with a higher functionality. For many applications a functionality of two or higher is required of the product. For convenience, the product can be referred to as a polyol if the molecular weight is from 134 to 20,000, with a hydroxyl functionality of 1 or higher, or as a high polymer if the molecular weight exceeds 20,000. Polyols have utility as a reactive component in urethane chemistry, melamine chemistry, esterification, epoxidation, and other processes, producing coatings, elastomers, adhesives, fibers, shaped articles, and a variety of other products. Preferred polyol molecular weight would be 250 to 10,000, with a preferred functionality of 2 to 4. Poly(trimethylene carbonate) as high polymer with functionality of 2 or less can be readily thermoformed, deposited from solution, machined, or extruded into films, fibers, or shaped articles, while high polymer with high functionality can be predicted by those skilled in chemistry to have value especially as an adhesive or in the role of a reactive polyol. Poly(trimethylene carbonate) as either a polyol or a high polymer is not readily degraded by heat, ultraviolet light, moisture, or heat, at temperatures up to at least 160° C. Preferred molecular weight for high polymer would be greater than 30,000, and preferred functionality would be greater than or equal to depending on the application and the economics.

The following examples will serve to illustrate specific embodiments of the invention and related embodiments disclosed herein. These examples are intended only as a means of illustration and should not be construed as limiting the scope of the invention in any way. Those skilled in the art will recognize many variations that may be made without departing from the spirit of the disclosed invention.

EXAMPLE 1

Example 1 demonstrates the procedure used in the runs for which data is provided in Table 1. In a drybox, trimethylene carbonate monomer, propanediol, and an anhydrous alkali or alkaline earth metal acetate catalyst were placed in multiple open glass vials held upright in a reaction kettle containing a layer of sand for improved heat distribution. While a nitrogen atmosphere was maintained, the kettle was immersed in preheated oil. At designated intervals, the kettle was opened and vials with different catalysts but held the same distance from the kettle wall were removed for comparative analysis. Referring to Example l(b) in Table I, and the third run (20), 2.02 grams TMC and 0.10 grams PDO were placed in a polymerization kettle with a sodium acetate catalyst in an amount of 40 ppm sodium. Under nitrogen at atmospheric pressure, the kettle was heated to 130° C. In the product 99.8% oligomer was measured. Results are shown in Table 1:

TABLE 1

| Catalyst/Ppm metal (wt) | ID | Temp. ° C. | Hours | Stoichiometric $M_n$ | NMR $M_n$ | Oligomer % | TMC % | PDO % | DiPDO % | PDi |
|---|---|---|---|---|---|---|---|---|---|---|
| | 24159-132 | | | | | | | | | |
| Ex. I(a) | 7 | 130 | 16 | 1540 | 1682 | 99.3 | 0.5 | 0.2 | 0 | |
| None | 13 | 130 | 8 | 1510 | 1590 | 99.1 | 0.8 | 0.1 | 0 | |
| | 19 | 130 | 4 | 1490 | 1749 | 99.0 | 0.8 | 0.2 | 0 | |
| | 25 | 130 | 2 | 1520 | 1687 | 98.8 | 1.2 | 0 | 0 | |
| | 31 | 130 | 1 | 1510 | 1520 | 98.9 | 1.1 | 0 | 0 | |
| Ex. I(b) | 8 | 130 | 16 | 1510 | 2079 | 99.7 | 0.2 | 0.1 | 0 | |
| NaOAc/40 | 14 | 130 | 8 | 1540 | 1660 | 99.7 | 0.2 | 0.1 | 0 | |
| | 20 | 130 | 4 | 1540 | 1658 | 99.8 | 0.1 | 0.1 | 0 | |
| | 26 | 130 | 2 | 1540 | 1648 | 99.4 | 0.6 | 0 | 0 | |
| | 32 | 130 | 1 | 1500 | 1709 | 99.5 | 0.5 | 0 | 0 | |
| Ex. I(c) | 9 | 130 | 16 | 1600 | 1453 | 99.3 | 0.5 | 0.2 | 0 | |
| NaOAc/40 | 15* | 130 | 8 | 1530 | 1804 | 99.2 | 0.6 | 0.2 | 0 | |
| Sn(Oct)$_2$/30** | 21 | 130 | 4 | 1510 | 1565 | 99.6 | 0.2 | 0.2 | 0 | |
| | 27 | 130 | 2 | 1420 | 1561 | 99.4 | 0.6 | 0 | 0 | |
| | 33 | 130 | 1 | 1560 | 1622 | 99.3 | 0.7 | 0 | 0 | |
| Ex. I(d) | 10 | 130 | 16 | 1520 | 1800 | 99.5 | 0.3 | 0.2 | 0 | |
| LiOAc/40 | 16 | 130 | 8 | 1520 | 1936 | 99.2 | 0.8 | 0 | 0 | |
| | 22 | 130 | 4 | 1520 | 1498 | 99.5 | 0.3 | 0.2 | 0 | |
| | 28 | 130 | 2 | 1520 | 1756 | 99.1 | 0.9 | 0 | 0 | |
| | 34 | 130 | 1 | 1550 | 1673 | 99.2 | 0.8 | 0 | 0 | |
| Ex. I(e) | 11 | 130 | 16 | 1530 | 1441 | 99.6 | 0.2 | 0.2 | 0 | |
| KOAc/40 | 17 | 130 | 8 | 1490 | 1772 | 98.9 | 1 | 0.2 | 0 | |
| | 23 | 130 | 4 | 1530 | 1588 | 99.7 | 0.2 | 0.1 | 0 | |
| | 29 | 130 | 2 | 1520 | 1540 | 99.5 | 0.5 | 0 | 0 | |
| | 35 | 130 | 1 | 1530 | 1782 | 99.4 | 0.6 | 0 | 0 | |

TABLE 1-continued

| Catalyst/Ppm metal (wt) | ID | Temp. ° C. | Hours | Stoichiometric $M_n$ | NMR $M_n$ | Oligomer % | TMC % | PDO % | DiPDO % | PDi |
|---|---|---|---|---|---|---|---|---|---|---|
| Ex. I(f) | 12 | 130 | 16 | 1510 | 1463 | 99.2 | 0.6 | 0.2 | 0 | |
| Ca₂Oac/40 | 18 | 130 | 8 | 1490 | 1801 | 98.9 | 0.9 | 0.2 | 0 | |
| | 24 | 130 | 4 | 1510 | 1618 | 99.0 | 0.8 | 0.2 | 0 | |
| | 30 | 130 | 2 | 1530 | 1755 | 99.0 | 1.0 | 0 | 0 | |
| | 36 | 130 | 1 | 1540 | 1667 | 99.1 | 0.9 | 0 | 0 | |
| | 24159-136 | | | | | | | | | |
| Ex. 1(g) | 36 | 135 | 0.4 | 1430 | 721 | 43.3 | 56.7 | 0 | 0 | |
| None | 27 | 130 | 0.7 | 1520 | 1022 | 63.2 | 36.8 | 0 | 0 | |
| | 30 | 130 | 1.0 | 1380 | 992 | 70.4 | 29.6 | 0 | 0 | |
| | 33 | 130 | 4.1 | 1520 | unk | unk | unk | unk | unk | 1.50 |
| | 24 | 130 | 4.1 | 1510 | 1678 | 89.9 | 10.1 | 0 | 0 | |
| Ex. 1(h) | 35 | 135 | 0.4 | 1520 | 3508 | 99.3 | 0.7 | 0 | 0 | |
| NaOAc/40 | 32 | 130 | 0.7 | 1530 | 1853 | 99.7 | 0.3 | 0 | 0 | |
| | 29 | 130 | 1.0 | 1520 | 1846 | 99.6 | 0.4 | 0 | 0 | |
| | 23 | 130 | 4.1 | 1510 | unk | unk | unk | unk | unk | 2.00 |
| Ex. I(i) NaOAc/10,000 | X | 27 | 1650 | N/A | 464 | 1.4 | 98.6 | 0 | 0 | |
| Ex. I(j) | 34 | 135 | 0.4 | 1350 | 894 | 42.6 | 57.4 | 0 | 0 | |
| Sn(II)Oct/40 | 31 | 130 | 0.7 | 1540 | 569 | 43.9 | 56.1 | 0 | 0 | |
| | 28 | 130 | 1.0 | 1430 | 915 | 59.3 | 40.7 | 0 | 0 | |
| | 22 | 130 | 4.1 | 1410 | 1462 | 99.1 | 0.9 | 0 | 0 | |
| | 24159-146 | | | | | | | | | |
| Ex. I(k) | 36 | 135 | 0*** | 1510 | 455 | 24 | 76 | 0 | 0 | |
| NaOAc/40 | 34 | 130 | 0.1 | 1570 | 838 | 33.1 | 66.9 | 0 | 0 | 1.12 |
| | 24 | 130 | 0.2 | 1520 | 604 | 28.5 | 71.5 | 0 | 0 | |
| | 12 | 130 | 0.3 | 1510 | 600 | 24.7 | 75.3 | 0 | 0 | |
| | 22 | 130 | 0.4 | 1490 | 1274 | 63 | 37 | 0 | 0 | |
| Ex. I(1) | 35 | 135 | 0*** | 1530 | 232 | 0.5 | 94.9 | 4.6 | 0 | |
| Sn(II)Oct/40 | 33 | 130 | 0.1 | 1550 | 196 | 0.3 | 96.3 | 3.4 | 0 | |
| | 23 | 130 | 0.2 | 1510 | 149 | 0.4 | 96 | 3.7 | 0 | |
| | 11 | 130 | 0.3 | 1560 | 181 | 0.4 | 94.5 | 5.1 | 0 | |
| | 21 | 130 | 0.4 | 1490 | 181 | 0.6 | 95.7 | 3.8 | 0 | |
| Ex. I(m) | 32 | 130 | 0.1 | 1540 | 659 | 28.9 | 71.1 | 0 | 0 | |
| NaOH/40 | 20 | 130 | 0.4 | 1530 | 1520 | 65.9 | 34.1 | 0 | 0 | |
| Ex. I(n) | 31 | 130 | 0.1 | 1540 | 544 | 24.1 | 75.9 | 0 | 0 | |
| NaCl/40 | 19 | 130 | 0.4 | 1550 | 643 | 31.4 | 68.6 | 0 | 0 | |
| Ex. I(o) | 30 | 130 | 0.1 | 1520 | 603 | 40.7 | 59.3 | 0 | 0 | |
| NaI/40 | 18 | 130 | 0.4 | 1540 | 810 | 46.7 | 53.3 | 0 | 0 | |
| Ex. I(p) | 29 | 130 | 0.1 | 1540 | 543 | 21.3 | 78.7 | 0 | 0 | |
| Na₂B₄O₇/40 | 17 | 130 | 0.4 | 1540 | 562 | 24.3 | 75.7 | 0 | 0 | |
| Ex. I(q) | 28 | 130 | 0.1 | 1520 | 1219 | 73.1 | 26.9 | 0 | 0 | |
| NaOMe/40 | 16 | 130 | 0.4 | 1510 | 1233 | 52.6 | 47.4 | 0 | 0 | |
| Ex. I(r) | 25 | 130 | 0.1 | 1500 | 799 | 40.2 | 59.8 | 0 | 0 | |
| Na₂Sebacate/40 | 13 | 130 | 0.4 | 1550 | 755 | 39.2 | 60.8 | 0 | 0 | |
| Ex. I(s) | 26 | 130 | 0.1 | 1500 | 216 | 0.2 | 95.2 | 4.6 | 0 | |
| Sn(II)Oct/200 | 14 | 130 | 0.4 | 1550 | 176 | 0.4 | 96 | 3.6 | 0 | |

*Possible excess Sn⁺⁺
**Sn(II)Oct - Tin(II) acetoate
***Time ZERO is 11 minutes after immersing multireactor into hot oil, which dropped to 75° C. before climbing to 125° C. at time ZERO then to 135° C. (within 2 minutes).
24159-146 also had varying periods of catalyst in the TMC (1–18 hours, Sn the longest), but similar periods with presence of PDO in vials.

EXAMPLE 2

In Example 2, in a drybox, trimethylene carbonate monomer, trimethylolpropane, and an anhydrous alkali or alkaline earth metal acetate catalyst were placed in a polymerization kettle containing a stirring mechanism. The quantity of trimethylolpropane charged was the stoichiometric amount calculated to give the desired molecular weight of polytrimethylene carbonate. After holding at 24° C. under nitrogen for 0.5–20 hours, the kettle was immersed in oil heated to typically 130° C. Samples were taken for analysis at appropriate times. In Example 2b, a second catalyst was added after the first sample was taken. The amount of trimethylene carbonate reacted, and other characteristics, were determined by nuclear magnetic resonance (NMR). Some samples were titrated for hydroxyl content to determine the equivalent weight. Results are shown in Table 2:

TABLE 2

| I.D. | Starting Material | TMC:TMP Moles | Target $M_n$ | Catalyst & ppm | Temp °C. | Total Hours | Eq. Wt. (1/OH#) | PDO % wt | % TMC Reacted | TMP OH Reacted | Carbonates per arm | Re-check TMC:TMP | Notes |
|---|---|---|---|---|---|---|---|---|---|---|---|---|---|
| Ex. 2a | | | | | | | | | | | | | |
| USM P1 | Scratch | 1.6:1 | 300 | None | 120 | 3 | | | Unk. | Unk. | Unk. | Unk. | |
| USM P2 | Scratch | 4.0:1 | 540 | None | 160 | 3 | 189 | Y | 89.8 | 67.8 | 2 | 4.4 | |
| USM P3 | Scratch | 7.5:1 | 900 | None | 160 | 3 | 305 | Trace | 96.4 | 67.7 | 3.3 | 7 | |
| Ex. 2b | | | | | | | | | | | | | |
| 24288-17 | Scratch | 1.6:1 | 300 | 50 ppm Ti (IV) | 110 | 4 | | Trace | 10.5 | 5.4 | 1 | 1.6 | Higher |
| 24288-18 | -17 | 1.6:1 | 300 | +50 ppm Al (III) | 110 | 8 | | Trace | 28.8 | 13 | 1.2 | 1.6 | TMP |
| 24288-20 | -18 | 1.6:1 | 300 | as is | 140 | 12 | | Y | 80.7 | 32.6 | 1.4 | 1.7 | water |
| 24288-22 | -20 | 1.6:1 | 300 | as is | 140 | 38 | | Y | 88.8 | 28.1 | 1.6 | 1.5 | content |
| 24288-23 | -22 | 1.6:1 | 300 | as is | 110 | 59 | | Y | 90.5 | 24.7 | 1.7 | 1.4 | |
| Ex. 2c | | | | | | | | | | | | | |
| 24159-70 | Scratch | 4.0:1 | 540 | 50 ppm Al (III) | 110 | 4 | | Y | 73.8 | 63.8 | 1.8 | 4.5 | TMP |
| 24159-74 | -70 | 4.0:1 | 540 | as is | 140 | 8 | | Trace | 93.5 | 57.8 | 2.4 | 4.5 | water |
| 24159-77 | -74 | 4.0:1 | 540 | as is | 140 | 34 | | Trace | 97.1 | 31.0 | 3.9 | 3.8 | 159 ppm; |
| 24159-82 | -77 | 4.0:1 | 540 | as is | 140 | 53 | | Y | 95.8 | 26.9 | 4.0 | 3.4 | TMC 87 ppm |
| Ex. 2d | | | | | | | | | | | | | |
| 24288-47-1 | Scratch | 1.6:1 | 300 | 90 ppm Sn (II) | 130 | 4 | | Trace | 30 | 14 | 1.3 | 1.7 | |
| 24288-47-2 | -47-1 | 1.6:1 | 300 | as is | 130 | 8 | | Trace | 49.2 | 21.6 | 1.3 | 1.8 | |
| 24288-47-3 | -47-2 | 1.6:1 | 300 | as is | 130 | 12 | | Y | 67.3 | 29.2 | 1.4 | 1.8 | |
| 24288-54-1 | -47-3 | 1.6:1 | 300 | as is | 130 | 18 | | Trace | 80 | 33.9 | 1.5 | 1.9 | |
| 24288-54-2 | -54-1 | 1.6:1 | 300 | as is | 130 | 25 | | Y | 85.8 | 32.4 | 1.6 | 1.8 | |
| 24288-54-3 | -54-2 | 1.6:1 | 300 | as is | 130 | 31 | | Trace | 86.3 | 30.7 | 1.6 | 1.7 | |
| Ex. 2e | | | | | | | | | | | | | |
| 24159-85A | Scratch | 5.3:1 | 670 | 40 ppm K+ | 130 | 4 | | Y | 98 | 50.8 | 3.3 | 5.1 | KOH, |
| 24159-85B | -85A | 5.3:1 | 670 | as is | 130 | 8 | | Y | 98.4 | 50.9 | 3.3 | 5.2 | >14% |
| 24159-85C | -85B | 5.3:1 | 670 | as is | 130 | 12 | | Y | 98.2 | 51.3 | 3.4 | 5.4 | Water |
| Ex. 2f | | | | | | | | | | | | | |
| 24159-86A | Scratch | 5.3:1 | 670 | 40 pm Na | 130 | 4 | | Trace | 99.2 | 52.9 | 3.3 | 5.3 | Gray Product |
| 24159-86B | -86A | 5.3:1 | 670 | as is | 130 | 8 | | Trace | 99.2 | 43.1 | 3.8 | 4.9 | Gray Product |
| 24159-86C | -86B | 5.3:1 | 670 | as is | 130 | 12 | | Trace | 100 | 42.2 | 4.2 | 5.3 | Gray Product |
| Ex. 2g | | | | | | | | | | | | | |
| 24159-90A | Scratch | 5.3:1 | 670 | None | 130 | 1 | | N | 0.3 | 0.6 | 1 | 6 | |
| 24159-90B | -90A | 5.3:1 | 670 | as is | 130 | 2 | | N | 1.5 | 2.7 | 1 | 5.4 | |
| 24159-90C | -90B | 5.3:1 | 670 | as is | 130 | 4 | | Y | 63.9 | 90.2 | 1.7 | 7.3 | |
| 24159-90D | -90C | 5.3:1 | 670 | as is | 130 | 8 | | Y | 97.5 | 49.7 | 3.1 | 4.8 | |
| 24159-90E | -90D | 5.3:1 | 670 | as is | 130 | 12 | | Y | 99.1 | 52.1 | 3.5 | 5.5 | |
| Ex. 2h | | | | | | | | | | | | | |
| 24159-91A | Scratch | 5.3:1 | 670 | 40 ppm Na | 130 | 1 | | Y | 100 | 40.4 | 3.2 | 3.8 | |
| 24159-91B | -91A | 5.3:1 | 670 | as is | 130 | 2 | | Y | 99 | 46.6 | 3.3 | 4.7 | |
| 24159-91C | -91B | 5.3:1 | 670 | as is | 130 | 4 | | Y | 100 | 52.7 | 3.2 | 5.1 | |
| 24159-91D | -91C | 5.3:1 | 670 | as is | 130 | 8 | | Y | 99 | 48 | 3.5 | 5.2 | |
| 24159-91E | -91D | 5.3:1 | 670 | as is | 130 | 12 | | Y | 100 | 44.9 | 3.6 | 4.9 | |
| Ex. 2i | | | | | | | | | | | | | |
| 24159-93A | Scratch | 7.5:1 | 900 | 40 ppm Na | 130 | 0.5 | | 0.7 | 97.9 | 68.8 | 3.9 | 8.3 | |
| 24159-93B | -93A | 7.5:1 | 900 | as is | 130 | 1 | | 0.7 | 98.4 | 64.5 | 4.1 | 8 | |
| 24159-93C | -93B | 7.5:1 | 900 | as is | 130 | 2.1 | | 0.6 | 98.4 | 68.1 | 4.1 | 8.6 | |
| 24159-93D | -93C | 7.5:1 | 900 | as is | 130 | 4 | 308 | 0.6 | 99 | 63.9 | 4.1 | 8 | |
| Ex. 2j | | | | | | | | | | | | | |
| 24159-97A | Scratch | 4.0:1 | 540 | 40 ppm Na | 130 | 0.5 | | 1.5 | 97.9 | 55.2 | 2.6 | 4.4 | 97D |
| 24159-97B | -97A | 4.0:1 | 540 | as is | 130 | 1 | | 1.4 | 97.5 | 52.7 | 2.6 | 4.3 | cooled in |
| 24159-97C | -97B | 4.0:1 | 540 | as is | 130 | 2 | | 2.2 | 98.5 | 50.4 | 2.6 | 4 | heating oil |
| 24159-97D | -97C | 4.0:1 | 540 | as is | 130 | 4 | | 2.3 | 95.9 | 44.2 | 2.8 | 3.9 | |
| Ex. 2k | | | | | | | | | | | | | |
| 24159-103A | Scratch | 4.0:1 | 540 | 45 ppm Na | 120 | 0.6 | | 0 | 9.4 | 16.2 | 1 | 5.2 | Poor |
| 24159-103B | -103A | 4.0:1 | 540 | as is | 110 | 1 | | 2.4 | 94.4 | 50.8 | 2.6 | 4.2 | heating |
| 24159-103C | -103B | 4.0:1 | 540 | as is | 110 | 2 | | 2.8 | 94.7 | 62.4 | 2.5 | 4.9 | control |
| 24159-105A | -103C | 4.0:1 | 540 | as is | 115 | 2.5 | | 2.1 | 98 | 49.9 | 2.5 | 3.9 | especially |
| 24159-105B | -105A | 4.0:1 | 540 | as is | 110 | 3.5 | 217 | 2 | 97.6 | 53.6 | 2.5 | 4.2 | 1st & 3rd hours |

TABLE 2-continued

| I.D. | Starting Material | TMC:TMP Moles | Target $M_n$ | Catalyst & ppm | Temp °C. | Total Hours | Eq. Wt. (1/OH#) | PDO % wt | % TMC Reacted | TMP OH Reacted | Carbonates per arm | Recheck TMC:TMP | Notes |
|---|---|---|---|---|---|---|---|---|---|---|---|---|---|
| Ex. 2l | | | | | | | | | | | | | |
| 24159-106A | Scratch | 1.6:1 | 300 | 40 ppm Na | 110 | 0.5 | | 0 | 25.7 | 14.7 | 1 | 1.7 | |
| 24159-106B | −106A | 1.6:1 | 300 | as is | 110 | 1 | | 7.1 | 88 | 33.8 | 1.3 | 1.5 | |
| 24159-106C | −106B | 1.6:1 | 300 | as is | 110 | 2 | | 8.9 | 96.5 | 30.7 | 1.5 | 1.4 | |
| 24159-107A | −106C | 1.6:1 | 300 | as is | 110 | 2.5 | | 6.6 | 91.5 | 27.8 | 1.4 | 1.3 | |
| 24159-107B | −107A | 1.6:1 | 300 | as is | 110 | 3 | | 7.8 | 92.8 | 31.8 | 1.5 | 1.5 | |
| Ex. 2m | | | | | | | | | | | | | |
| 24159-111A | Scratch | 1.6:1 | 300 | 10 ppm Na | 115 | 0.5 | | 0 | 1.1 | 0.7 | 1 | 1.9 | 119C is |
| 24159-111B | −111A | 1.6:1 | 300 | as is | 110 | 1 | | 0 | 3 | 1.7 | 1 | 1.7 | rubbery |
| 24159-111C | −111B | 1.6:1 | 300 | as is | 110 | 2.1 | | 0 | 6.6 | 3.4 | 1 | 1.5 | solid |
| 24159-111D | −111C | 1.6:1 | 300 | as is | 110 | 4 | | 8 | 87.8 | 33.9 | 1.3 | 1.5 | |
| 24159-111E | −111D | 1.6:1 | 300 | as is | 110 | 8 | | 5.6 | 96.5 | 26.1 | 1.6 | 1.3 | |
| 24159-112A | −111E | 1.6:1 | 300 | as is | 110 | 11.8 | | 1.1 | 97.3 | 24.8 | 1.7 | 1.3 | |
| 24159-112B | −112A | 1.6:1 | 300 | as is | 110 | 18 | | 3.3 | 99 | 23.4 | 1.9 | 1.3 | |
| 24159-117A | −112B | 1.6:1 | 300 | as is | 110 | 32 | | 2.7 | 93.4 | 20.7 | 1.9 | 1.3 | |
| 24159-118B | −117A | 1.6:1 | 300 | as is | 110 | 59 | | 2.9 | 88.5 | 16.7 | 2 | 1.2 | |
| 24159-119C | −118B | 1.6:1 | 300 | as is | 110 | 174.1 | | | | | | | |
| Ex. 2n | | | | | | | | | | | | | |
| 24159-114A | Scratch | 1.6:1 | 300 | 40 ppm Na | 75 | 0.5 | | 0 | 3.1 | 2.1 | 1 | 2 | |
| 24159-114B | −114A | 1.6:1 | 300 | as is | 70 | 1 | | 0 | 3 | 1.9 | 1 | 1.9 | |
| 24159-114C | −114B | 1.6:1 | 300 | as is | 70 | 2 | | 0 | 3.4 | 2.2 | 1 | 1.9 | |
| 24159-114D | −114C | 1.6:1 | 300 | as is | 70 | 4 | | 0 | 6.7 | 3.9 | 1 | 1.8 | |
| 24159-114E | −114D | 1.6:1 | 300 | as is | 70 | 8 | | 0 | 8.6 | 6.8 | 1 | 2.4 | |
| 24159-115A | −114E | 1.6:1 | 300 | as is | 70 | 16 | | 0 | 25 | 15.2 | 1 | 1.8 | |
| 24159-116A | −115A | 1.6:1 | 300 | as is | 70 | 24 | | 0.9 | 42.2 | 21.1 | 1.1 | 1.6 | |
| 24159-116B | −116A | 1.6:1 | 300 | as is | 70 | 40.1 | | 1.7 | 72.3 | 35.2 | 1.1 | 1.6 | |
| 24159-118A | −116B | 1.6:1 | 300 | as is | 70 | 64.9 | | 6.6 | 93.3 | 30.8 | 1.4 | 1.4 | |
| 24159-119A | −118A | 1.6:1 | 300 | as is | 70 | 116 | | 5.3 | 99.1 | 27.1 | 1.6 | 1.3 | |
| 24159-119B | −119A | 1.6:1 | 300 | as is | 70 | 158.8 | | 5.5 | 98.2 | 24.6 | 1.6 | 1.2 | |
| Ex. 2o | | | | | | | | | | | | | |
| 24159-122B | −122A | 1.6:1 | 300 | 10 ppm Na | 110 | 5.6 | | 8.1 | 95.5 | 29.3 | 1.4 | 1.3 | |
| 24159-122C | −122B | 1.6:1 | 300 | as is | 110 | 15 | 121 | 5.5 | 97.1 | 26.2 | 1.5 | 1.3 | |
| Ex. 2p | | | | | | | | | | | | | |
| 24288-94-1 | Scratch | 11.9:1 | 1350 | 40 ppm Na | 130 | 4 | 445 | 0 | 99.2 | 79 | 6 | 14.4 | |
| 24288-94-2 | Scratch | 16.5:1 | 1800 | 40 ppm Na | 130 | 4 | 573 | 0.7 | 98.8 | 78.5 | 7.5 | 17.9 | |

EXAMPLE 3

In Example 3 higher molecular weight poly(trimethylene carbonate) was produced. In a drybox, trimethylene carbonate monomer and an anhydrous sodium acetate catalyst were placed in a polymerization kettle containing a stirring mechanism. The quantity of the catalyst charged was calculated to result in the desired total metal weight, and was about 100 ppm of sodium based on reactants. The kettle was sealed with Schlenk connectors, then taken to the site of a stirring motor and a nitrogen source. Under nitrogen at atmospheric pressure, the kettle was heated to 135° C., while the contents were stirred. The compounds produced were measured by NMR to determine the % polymer present and the % unreacted starting material, TMC. The % oligomer, MW, and PDi were measured by GPC. Data are shown in Table 3:

TABLE 3

| Batch Size | 200 g |
|---|---|
| Catalyst | 100 Na+ |
| Ppm X | |
| Temp. ° C. | 135 |
| Time hrs. | 20 |
| % ether links replacing | 0 |
| carbonate group (NMR) | |
| % Polymer (NMR) | 98.5 |
| % Oligomer (GPC) | 2.9 |
| % TMC (NMR) | 1.5 |
| $M_w$* (LES) | 91,000 |
| PDi (GPC-RI) | 2.37 |
| $M_n$* | 38,000 |

*Oligomer not included in MW calculations

From the foregoing description, one skilled in the art can easily ascertain the essential characteristics of this invention, and without departing from the spirit and scope thereof, can make various changes and modifications of the invention to adapt it to various uses and conditions. Such changes and modifications would be considered within the scope of the invention.

We claim:

1. A process for the production of poly(trimethylene carbonate) which comprises:

Reacting trimethylene carbonate and one or more polyhydric alcohols, individually, or in combination, in a stoichiometric ratio to give the desired molecular weight of poly(trimethylene carbonate) in the presence of from 1 to 10,000 ppm of metal based on reactants of a catalyst selected from the group consisting of a salt of an element from Group IA or IIA of the Periodic Table under inert atmosphere at elevated temperature for up to four hours.

2. The process of claim 1 wherein said polyhydric alcohols are selected from the group consisting of diols and triols, individually, or in combination.

3. The process of claim 1 further comprising that the reaction takes place at a temperature of 50 to 160° C.

4. The process of claim 1 wherein the catalyst is selected from the group consisting of salts of lithium, potassium, sodium, calcium, individually, or in combination.

5. The process of claim 1 wherein said product poly(trimethylene carbonate) is characterized as being clear as water.

6. The process of claim 1 wherein said product poly(trimethylene carbonate) is characterized in that all end groups detected are hydroxypropyl groups as determined by NMR.

7. The process of claim 1 wherein the process is characterized by no measurable decarboxylation as determined by NMR.

8. The process of claim 2 wherein the polyhydric alcohol is selected from the group consisting of propanediol, trimethylolpropane, individually, or in combination.

9. The process of claim 4 wherein the catalyst is selected from the group consisting of acetates of lithium, potassium, sodium, calcium, individually or in combination.

10. The process of claim 1 wherein the amount of the element of Group IA or IIA is from 5 to 1000 ppm metal based on reactants.

11. The process of claim 10 wherein the amount of the element of Group IA or IIA is from 10 ppm to 100 ppm of metal based on reactants.

12. The process of claim 10 wherein the catalyst is sodium acetate.

13. The process of claim 3 wherein the temperature is from 100 to 150° C.

14. The process of claim 13 wherein the temperature is from 10 to 140° C.

15. The process of claim 14 wherein the temperature is from 110 to 130° C.

16. The process of claim 1 wherein the ratio of trimethylene carbonate to polyhydric alcohol is from 1:1 to 100:1, respectively, and the number average molecular weight of the product poly(trimethylene carbonate) is from 134 to 20,000.

17. The process of claim 16 wherein the number average molecular weight of the product poly(trimethylene carbonate) is from 250 to 10,000.

18. The process of claim 1 wherein no solvent is used.

19. The process of claim 1 wherein the reaction time is from 0.25 to 3 hours.

20. The process of claim 11 wherein the amount of element Group IA or IIA is from 10 to 40 ppm of metal based on reactants.

21. A process for the production of poly(trimethylene carbonate) having a number average molecular weight of greater than 20,000 which comprises: Reacting trimethylene carbonate and optionally a polyhydric alcohol under inert atmosphere at a temperature of from 50 to 160° C. for from 5 to 30 hours in the presence of from 1 to 10,000 ppm of metal based on reactants of a catalyst selected from the group consisting of a salt of an element from group IA or IIA of the Periodic Table.

22. The process of claim 21 wherein the catalyst is selected from the group consisting of salts of lithium, potassium, sodium, calcium, individually, or in combination.

23. The process of claim 21 wherein said product poly(trimethylene carbonate) is characterized as being clear as water.

24. The process of claim 21 wherein the process is characterized by no measurable decarboxylation as determined by NMR.

25. The process of claim 21 wherein an alcohol is used comprising a polyhydric alcohol.

26. The process of claim 25 wherein the polyhydric alcohol is selected from the group consisting of diols and triols.

27. The process of claim 26 wherein the polyhydric alcohol is selected from the group consisting of propanediol, trimethylolpropane, individually, or mixtures thereof.

28. The process of claim 22 wherein the catalyst is selected from an acetate of lithium, potassium, sodium, calcium, individually or combinations thereof.

29. The process of claim 22 wherein the amount of element of Group IA or IIA is from 5 to 1000 ppm metal based on reactants.

30. The process of claim 29 wherein the amount of element of Group IA or IIA is from 40 ppm to 150 ppm of metal based on reactants.

31. The process of claim 28 wherein the catalyst is sodium acetate.

32. The process of claim 21 wherein the temperature is from 100 to 150° C.

33. The process of claim 32 wherein the temperature is from 120 to 135° C.

34. The process of claim 26 wherein the trimethylene carbonate and polyhydric alcohol are reacted in a stoichiometric ratio to give the desired molecular weight of poly(trimethylene carbonate).

35. The process of claim 21 wherein no solvent is used.

36. The process of claim 22 wherein the reaction time is from 5 to 20 hours.

37. The process of claim 19 wherein the reaction time is from 0.25 to 2 hours.

* * * * *